United States Patent
Seger et al.

(10) Patent No.: US 9,290,321 B2
(45) Date of Patent: Mar. 22, 2016

(54) STORAGE SECTION OF A CONVEYOR DEVICE AND METHOD FOR TEMPORARILY STORING ARTICLES

(71) Applicant: Krones AG, Neutraubling (DE)

(72) Inventors: Martin Seger, Neumarkt i.d. Oberpfalz (DE); Johann Huettner, Mallersdorf-Pfaffenberg (DE); Matthias Wahl, Langquaid (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/331,380

(22) Filed: Jul. 15, 2014

(65) Prior Publication Data

US 2015/0021143 A1    Jan. 22, 2015

(30) Foreign Application Priority Data

Jul. 17, 2013   (DE) .......................... 10 2013 107 582

(51) Int. Cl.
| | |
|---|---|
| *B65G 1/00* | (2006.01) |
| *B65G 1/04* | (2006.01) |
| *B65G 15/00* | (2006.01) |
| *B65G 47/51* | (2006.01) |

(52) U.S. Cl.
CPC *B65G 1/04* (2013.01); *B65G 15/00* (2013.01); *B65G 47/5131* (2013.01); *B65G 47/5122* (2013.01)

(58) Field of Classification Search
CPC .................................. B65G 21/14; B65G 1/00
USPC .............................................. 198/347.1, 812
See application file for complete search history.

(56) References Cited

U.S. PATENT DOCUMENTS

| | | | | |
|---|---|---|---|---|
| 2,932,376 | A | * | 4/1960 | Millington ..................... 198/812 |
| 4,413,724 | A | * | 11/1983 | Fellner .......................... 198/594 |
| 6,591,963 | B2 | | 7/2003 | Wipf |
| 8,365,905 | B2 | | 2/2013 | Fege |

(Continued)

FOREIGN PATENT DOCUMENTS

| | | |
|---|---|---|
| DE | 10312695 B4 | 10/2004 |
| EP | 1275603 B1 | 3/2004 |
| EP | 2184240 B1 | 6/2012 |

(Continued)

OTHER PUBLICATIONS

Extended European Search Report for EP 14 17 5217 dated Dec. 8, 2014.

(Continued)

*Primary Examiner* — James R Bidwell
(74) *Attorney, Agent, or Firm* — Dennemeyer & Associates, LLC

(57) ABSTRACT

A storage section for the intermediate storage of articles, packaged or piece goods of a conveyor device. The storage section has at least one storage span on a first level and at least one empty span on a second level that is connected with the storage span. The storage span has two flexible loading and transport sections that run parallel to one another in opposite directions on the first level for the articles, packaged or piece goods to be stored, connected by a first diversion section. The endlessly circulating loading and transport sections are connected by a second diverting section in the area of the empty span. The positions of the first diversion section and the second diversion section can be changed in opposite directions such that a storage volume of the storage span can be varied.

14 Claims, 6 Drawing Sheets

(56) References Cited

U.S. PATENT DOCUMENTS

2007/0221478 A1 9/2007 Monti
2013/0284563 A1 10/2013 Lopez et al.

FOREIGN PATENT DOCUMENTS

| | | |
|---|---|---|
| ES | 2400901 A1 | 4/2013 |
| FR | 2810653 A1 | 12/2001 |
| WO | 2008/026478 A1 | 3/2008 |
| WO | 2012/035280 A1 | 3/2012 |

OTHER PUBLICATIONS

German Search Report for DE 10 2013 107 582.7.

* cited by examiner

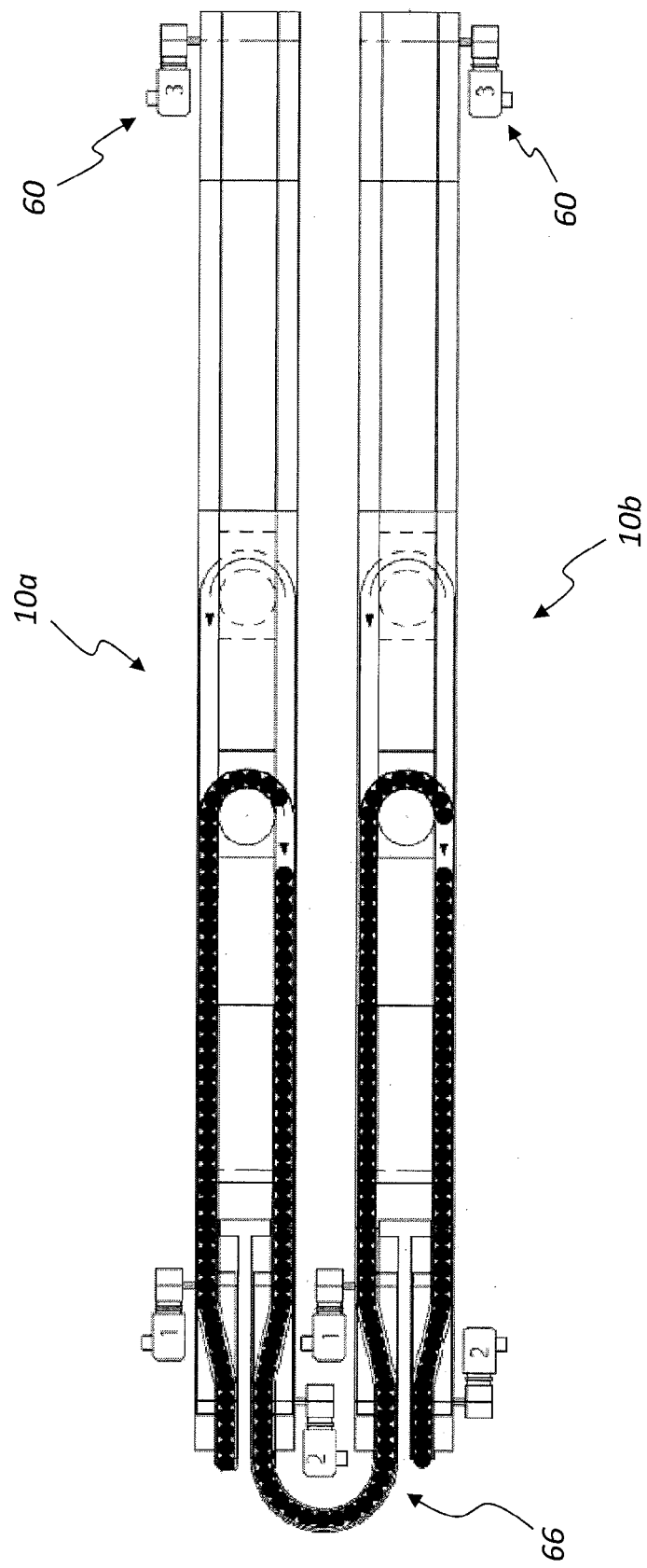

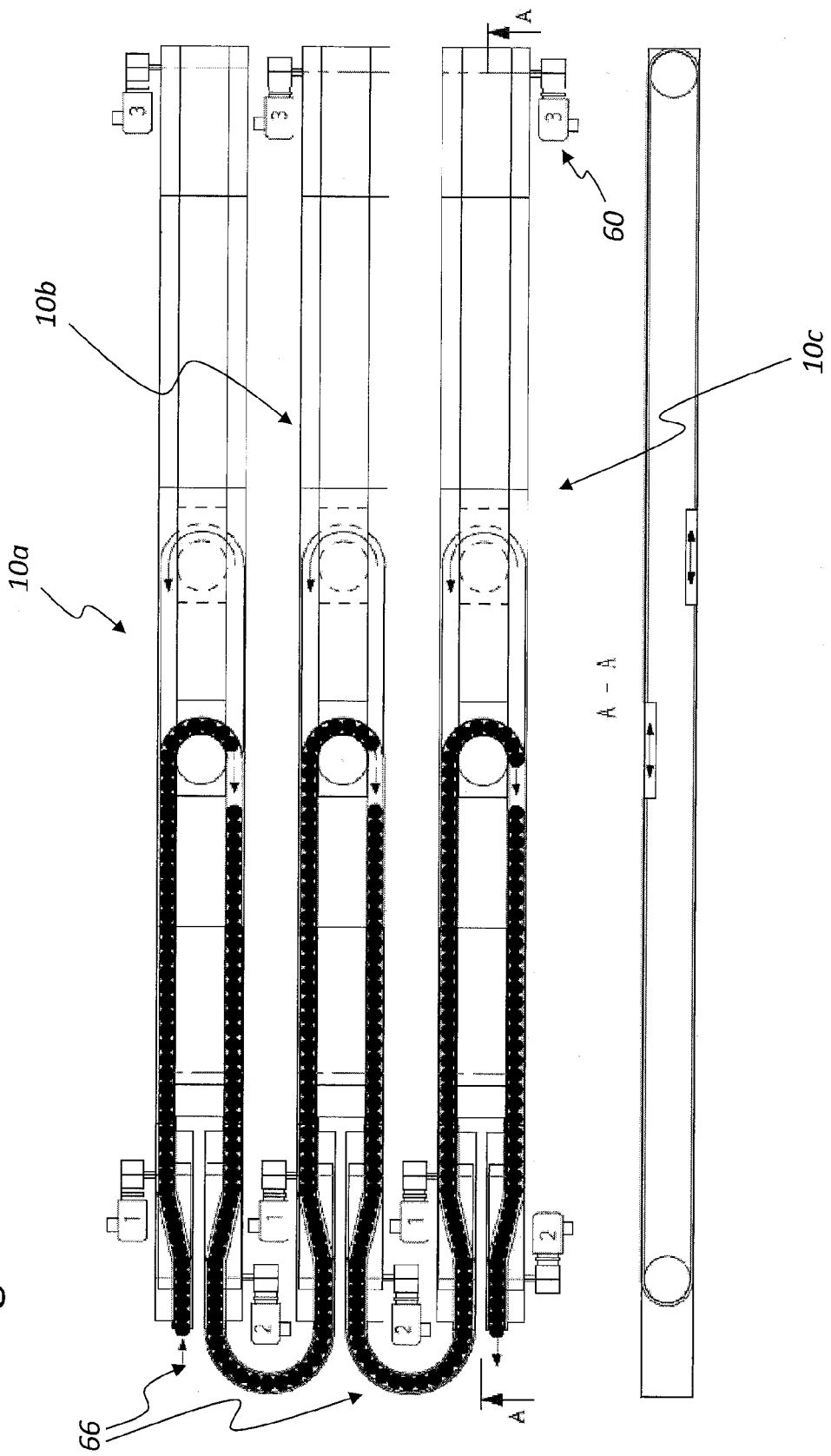

STORAGE SECTION OF A CONVEYOR DEVICE AND METHOD FOR TEMPORARILY STORING ARTICLES

This invention concerns a storage section for the intermediate storage of articles, packaged or piece goods of a conveyor device for the continuous or intermittent transport of articles, packaged or piece goods. The invention further concerns a method for the intermediate storage of articles, packaged or piece goods continuously or intermediately transported by a conveyor device.

In bottling, handling, and/or packaging plants, articles, packaged or piece goods, and/or containers of all types are generally transported by means of numerous conveyor devices over various paths, inter alia to connect various machine parts or modules. When a product is changed, a machine is shut down, or in the event of malfunctions, products remain on the transport paths, and, depending on the situation, may have to be removed in order for the device to be restarted. In some cases, too few products may be present in certain segments, e.g., in the supply line of a packaging module, which may result in delays in operation and transport.

In order to store excess products or to feed missing products into a transport process without damaging delays, storage devices are used that are constantly connected with the transport path and can receive a certain number of products for transport.

A known type of container or article storage device provides either a vertical buffer system in the passage or a horizontal buffer table that can be operated from one side. These systems generally involve piling up the respective containers before pushing them (horizontally) or lifting them (vertically). Thus, the respective movement can only occur in the presence of a certain number of containers, because otherwise, empty spaces result that cannot later be filled. Additionally, vertical storage devices are either incapable of handling containers of a certain width, or require appropriate modifications in order to do so.

A device for storing articles constantly and sequentially transported along a transport path is disclosed in DE 103 12 695 B4. The article is transported out of the storage in the same order in which it was brought into it, according to the FIFO ('first in—first out') principle. The storage device has a plurality of storage conveyors arranged parallel to one another, which are formed by circumferentially driven conveyor chains. Each of the storage conveyors is connected with a first drive for filling and a second drive for emptying. This prior-art storage device serves in particular to store articles in the vent of malfunctions of the production device, and to return the articles after the malfunction has been remedied.

EP 1 275 603 B1 discloses another storage device having a slide that is movable along a conveyor level with guide pulleys for the subdivision of an endless conveyor into a storage span and an empty span. First guide pulleys guide the empty span from the conveyor level into a parallel lower level arranged at a distance from the conveyor level. Second guide pulleys, in turn, transfer the guided empty span into the storage span on the other conveyor level. The empty span requires little space because it runs along the back of the storage span.

Additional storage devices or accumulating conveyors are known from WO 2012/035280 A1 and EP 2 184 240 B1.

Given the storage devices and methods known from the prior art, the most important objective of the invention is to improve control accuracy and reduce reaction times in adjustments to the storage capacity of such a storage device or method.

This objective of the invention is met by the subject-matter of the independent claims. Features of advantageous configurations of the invention can be found in the dependent claims and the rest of the specification. To achieve the aforementioned objective, the invention proposes a storage section for the storage of articles, packaged or piece goods belonging to a conveyor device, preferably in a packaging plant, for the continuous or intermittent transport of articles, packaged or piece goods, having the features of independent claim 1. The storage section, by definition, comprises at least one storage span on a first level and at least one empty span on a second level that is connected with the storage span. Normally, these two levels are each horizontal and parallel to one another, with the second level, in which the empty span is located, being arranged below the first level containing the storage span. The storage span has at least two flexible loading and transport sections that run parallel to one another in opposite directions on the first level for the intermediate storage articles, packaged or piece goods, which loading and transport sections are connected by a first diversion section describing a circular arc of approximately 180°. The loading and transport sections of the storage span, which move in opposite directions, are between locally defined receiving and transfer points for the articles, packaged or piece goods being transported, or additional horizontal transport sections of the conveyor device. These additional horizontal transport sections may either be transport connections to other machine parts and stations or, optionally, may be formed by connection sections creating transport connections to additional storage sections that are of the same type or similar in structure and function.

The fact that the first diversion section connects the loading and transport sections that move in opposite directions at a point opposite the receiving and transfer points gives the storage span, as seen from above, a U-shaped configuration. The articles, packaged or piece goods to be stored pass the receiving point, thus entering the storage section, are conveyed in a straight line on the first stand of the horizontally moving loading and transport section up to the diversion section, where they are diverted by app. 180° and conveyed via the second strand of the loading and transport section that moves parallel to and in a direction opposite to the first strand up to the transfer point, which may be at the same height and in the immediate proximity of the receiving point.

Optionally, the transfer point may have a connection to other horizontal conveyor devices by which the articles, packaged or piece goods are transported to other handling and/or processing stations, or to packaging stations, etc. As noted above, however, cascading arrangements of multiple storage sections, which may be arranged adjacent and/or parallel to one another, are also possible, with one transfer point of a first storage section being connected via a short connection section—e.g., with 180° diversion—to a receiving point of a neighbouring storage section. This connecting section is preferably a conventional conveyor, more preferably having a curved part and its own drive. This results in almost unlimited possibilities for selecting, modifying, and adapting configurations to different machine environments and configurations.

As noted above, the at least one empty span circulates in the second level, beneath the first level of the storage span, with the loading and transport sections of the storage span each being diverted in the area of the receiving and transfer points by first diverting means from the first level to the second level, and with the endlessly circulating loading and transport sections being connected in the area of the empty span by a second diversion section that describes a circular arc of app.

180°. 'Diverting means' refers here normally to rotary guide pulleys arranged so as to rate around horizontal axes. Because, however, the endlessly circulating loading and transport sections also require a drive, the aforementioned diverting means may also be formed by driving rollers, e.g., coupled with speed-controllable electrical drive motors. In a preferred embodiment, both the diverting means and the diversion sections form diversion angles of approximately 180°, with the diversion sections each creating a curved course within the horizontal levels in which the storage and empty spans each circulate, whilst the diverting means or guide pulleys create a diversion of the loading and transport sections from the first to the second level, or vice versa, such that the surface of the loading and transport sections there each describe a curved course.

The second diversion section also connects the loading and transport sections of the empty span at a point opposite the receiving and transfer points, such that, depending on operating conditions, the first and second diversion sections may be arranged one over the other or offset from one another.

According to the invention, the first diversion section of the storage span corresponds to an upper span, in the area of the first level, of at an endless cord arranged between at least two second diverting means and coupled therewith. The lower span of this endless cord, on the other hand, runs in the area of the second level, and is coupled there with the second diversion section of the empty span. The positions of the first diversion second and the second diversion section can be changed in opposite directions by moving the driven endless cord, such that a storage volume of the storage span can be varied by changing the position of the first diversion section and changing the position of the second diversion section of the empty span. The storage section according to the invention thus has not only the endlessly circulating loading and transport sections, the course of which is distributed between the storage span and the empty span and determines the storage area or volume currently available to receive transported articles, packaged or piece goods based on the length of the storage span, but additionally has an endless cord, e.g., a link belt, which, together with the endlessly circulating loading and transport sections and its diversion sections allows for fast, highly accurate adjustment and adaptation of the storage volumes by means of changing the positions of the two diversion sections at different levels in opposite direction, and thus the available lengths of the straight belt sections of the storage and empty spans.

This endless cord thus connects the two diversion sections, and is attached on both sides to each diversion section. The endless cord preferably covers the intermediate space created by the configuration of the system. This provides a secure structure; under no circumstances can accidental injuries be caused by careless interventions by operators.

Both the empty span and the storage span may be formed, in particular, by a common, endlessly circulating conveyor belt, link belt, etc., which allows for transport in vertical or horizontal position of the articles, packaged or piece goods and returns empty to the empty span, such that the empty span is required only to balance the adjustable-length area of the storage span. In order to provide the desired function in the most space-efficient way possible, the first level, on which the storage span with its first diversion section is positioned, is arranged above the second level, in which the empty span with its section diversion section is positioned. Advantageously, the first and second diversion sections of the storage or empty spans each describe a semicircular arc with a vertical diversion axis.

An advantageous embodiment of the storage section according to the invention may provide for the endless cord running between the two second diverting means to be formed by a flexible conveyor belt, link belt, strap, etc. Additionally, the second diverting means are preferably formed with guide pulleys with approximately horizontal rotational axes via which the endless cord runs and is diverted by 180°. Additionally, according to another preferred embodiment, the bottoms of the circulating loading and transport sections of the storage span lie on an outer or upper side of the upper span of the endless cord, and slide over them. Additionally, according the bottoms of the circulating loading and transport sections of the empty span may lie on an outer or downward outer side of the lower span of the endless cord, and slide over them. The endless cord thus constitutes not only a component of a precisely controllable, very fast-moving control mechanism for the adjustment of the capacity of the storage section, but simultaneously forms part of a support structure for the belt sections of the endlessly circulating loading and transport sections, on which the articles, packaged or piece goods are transported in the area of the storage span. Optionally, at least one of the second diverting means may be coordinated with a drive system for adjusting the endless cord.

In addition to the storage section described in various embodiments above, the invention also concerns an arrangement of two or more such storage sections, in which a transfer point of a first storage section is coupled with a receiving point of another, adjacent storage section via a horizontal transport section formed as an arcuate connection section. Optionally, three or more storage sections may each be coupled via horizontal transport sections formed as arcuate connection sections. Addition, it may be provided for two or more such storage sections each to be arranged adjacent to one another on a common horizontal plane with parallel endless cords, with the respective endless cords either being adjustable via a common drive system or each having separate drive systems for adjustment. Generally, these arrangements can be structured and expanded in any desired manner, in particular using different heights, because the connection sections optionally may pass over upward and downward inclines, if desired. Thus, several of the storage sections according to the invention may be arranged on top of one another at different heights and/or adjacent to one another. Advantageously, only endless cords of the type including diverting means or guide pulleys that align on at least one side are coupled via common adjustment systems.

To meet the aforementioned objective, this invention further comprises a method for the intermediate storage of articles, packaged or piece goods continuously or intermediately transported by a conveyor device. In this method, articles, packaged or piece goods to be stored are transported into a storage section having at least one storage span on a first level and at least one empty span on a second level that is connected with the storage span. The storage span has at least two flexible loading and transport sections that run parallel to one another in opposite directions on the first level for the intermediate storage articles, packaged or piece goods, which loading and transport sections are connected by a first diversion section describing a circular arc of approximately 180°. The loading and transport sections of the storage span, which move in opposite directions, are connected with locally defined receiving and transfer points, at which the articles, packaged or piece goods are received from or transferred to the conveyor device. The first diversion section connects the loading and transport sections that move in opposite directions at a point opposite the receiving and transfer points. Additionally, the at least one empty span circulates on the second level, which is below the first level of the storage span. The loading and transport sections of the storage span are each diverted from the first to the second level in the area of the receiving and transfer points by first diverting means. Additionally, the endlessly circulating loading and transport sections are connected by a second diverting section, which describes a circular arc of approximately 180°, in the area of the empty span. The second diversion section connects the loading and transport sections of the empty span that move in opposite directions at a point opposite the receiving and transfer points. The first diversion section of the storage span corresponds to an upper span, in the area of the first level, of one endless cord arranged between at least two second diverting means and coupled therewith. The lower span of the endless cord is located in the area of the second level, and coupled there with the second diversion section of the empty span, whereby the positions of the first diversion section and the second diversion section are changed in opposite directions by movements of the driven endless cord, such that a storage volume of the storage span is adjusted by changes in the position of the first diversion section and opposite changes in the position of the second diversion section of the empty span.

Exemplary embodiments of the invention and their advantages are described below by reference to the attached drawings. The size ratios of the individual elements to one another in the drawings do not always correspond to the actual ratios, as some forms are simplified and others have been magnified compared to other elements for better illustration.

FIG. 1b shows a detailed cutaway of the top view of the storage section of FIG. 1a.

FIG. 2a shows a schematic view of a second embodiment of a storage section according to the invention;

FIG. 2b shows an alternative variant of the storage section of FIG. 2a;

FIG. 2c shows a detailed cutaway of the top view of the storage section of FIG. 2a.

FIG. 3 shows a schematic view of a third embodiment of a storage section according to the invention.

Figure 1A:
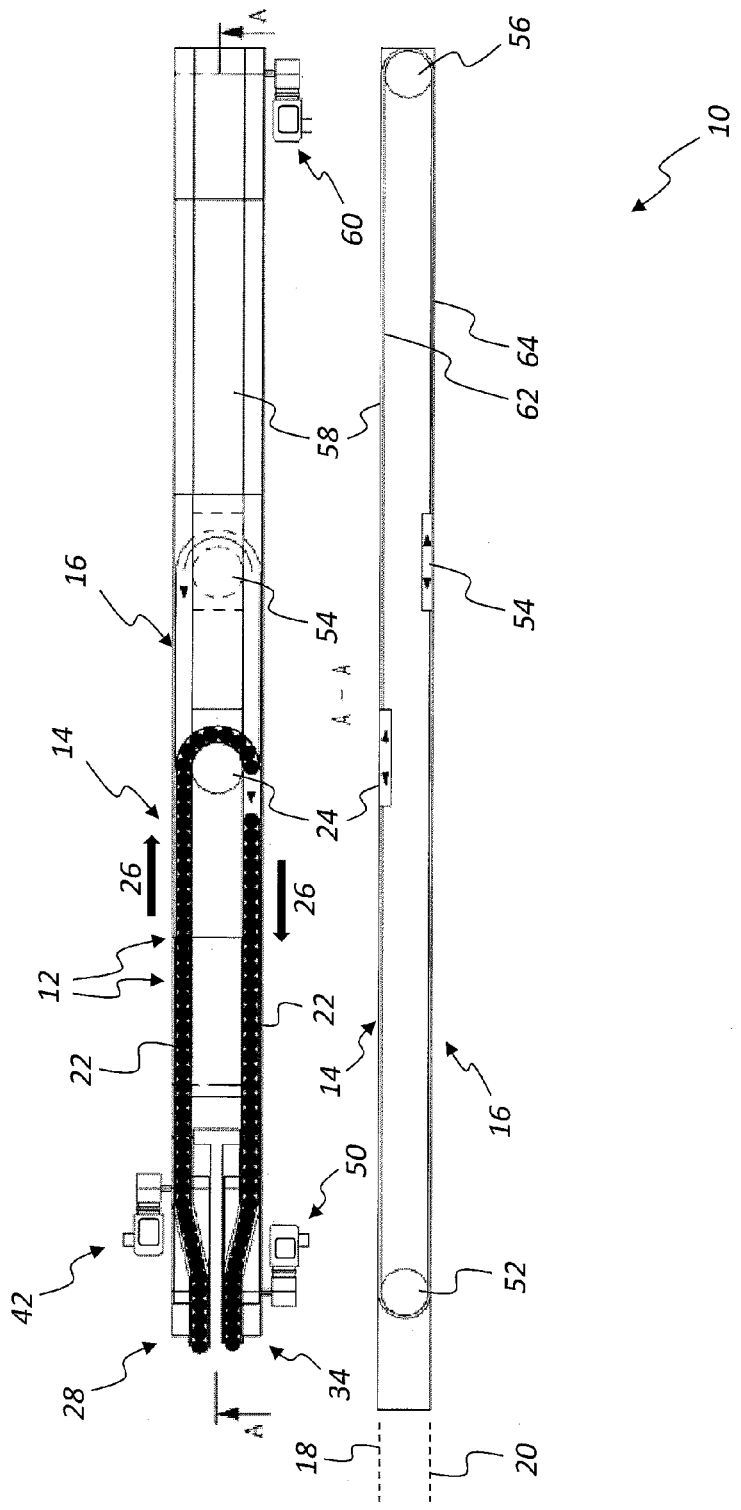
FIG. 1a shows two schematic views of a first embodiment of a storage section according to the invention.

Identical reference numerals are used to designated the same or functionally similar elements of the invention. Additionally, for ease of reference, only reference numerals required for the description of the respective drawing are included in each drawing. The embodiments shown are merely examples of possible configurations of the device or method according to the invention and are in no way intended as limitations thereof.

The two schematic views of FIG. 1 illustrate a first embodiment of the storage section 10 according to the invention for the intermediate storage of articles, packaged or piece goods of a conveyor device for the continuous or intermittent transport of articles, packaged or piece goods. The articles, packaged or piece goods transported and stored in the storage section 10 are referred to hereinafter merely as 'articles 12' for the sake of simplicity; this is in no way to be construed as a limitation of the invention.

The upper view shown in FIG. 1a is a top view of the storage section 10, whilst the view below it is a longitudinal section of that top view along the line A-A.

The simplest embodiment of the storage section 10 of the invention, as shown in FIG. 1a, comprises a storage span 14 and an empty span 16. The storage span is located on a first level 18, and the empty span 16 connected with it is located on a second level 20. As can be clearly seen in FIG. 1, the two levels 18 and 20 are each horizontal and parallel to one another, with the second level 20, in which the empty span 16 is located, being arranged below the first level 18 containing the storage span 14.

The storage span 14 has two flexible loading and transport sections 22 that run parallel to one another in opposite directions on the first level 18 for the articles 12 to be stored, which loading and transport sections 22 are connected by a first diversion section 24 describing a circular arc of approximately 180°. The loading and transport sections 22 of the storage span 14, which move in opposite directions relative to the direction of transport 26 (see arrow directions in FIG. 1a) correspond to fixed receiving and transfer points for the articles 12 transported, which may be connected, e.g., with additional horizontal transport sections of the conveyor device (not shown). These additional horizontal transport sections may either be transport connections to other machine parts and stations or, optionally, may be formed by connection sections creating transport connections to additional storage sections that are of the same type or similar in structure and function, as shown, by way of example in FIGS. 2 and 3. The configuration of the receiving and transfer points is more clearly shown in FIG. 1b, and is discussed in greater detail by reference to this detail view.

FIG. 1a clearly shows the U-shaped course of the storage span 14, which is formed by the guide of the loading and transport sections 22 that move in opposite directions relative to the direction of transport 26, which is diverted by 180°, around the first diversion section 24 within the first level 18. The articles 12 to be stored pass the receiving point 28 (cf. FIG. 1b), thus entering the storage section 10, are conveyed in a straight line on the first stand 30 of the horizontally moving loading and transport section 22 up to the first diversion section 24, where they are diverted by app. 180° and conveyed via the second strand 32 of the loading and transport section that moves parallel to and in a direction opposite to the first strand 28, relative to the direction of transport 26, up to the transfer point 34, which is at the same height and in the immediate proximity of the receiving point 28.

Figure 1B:
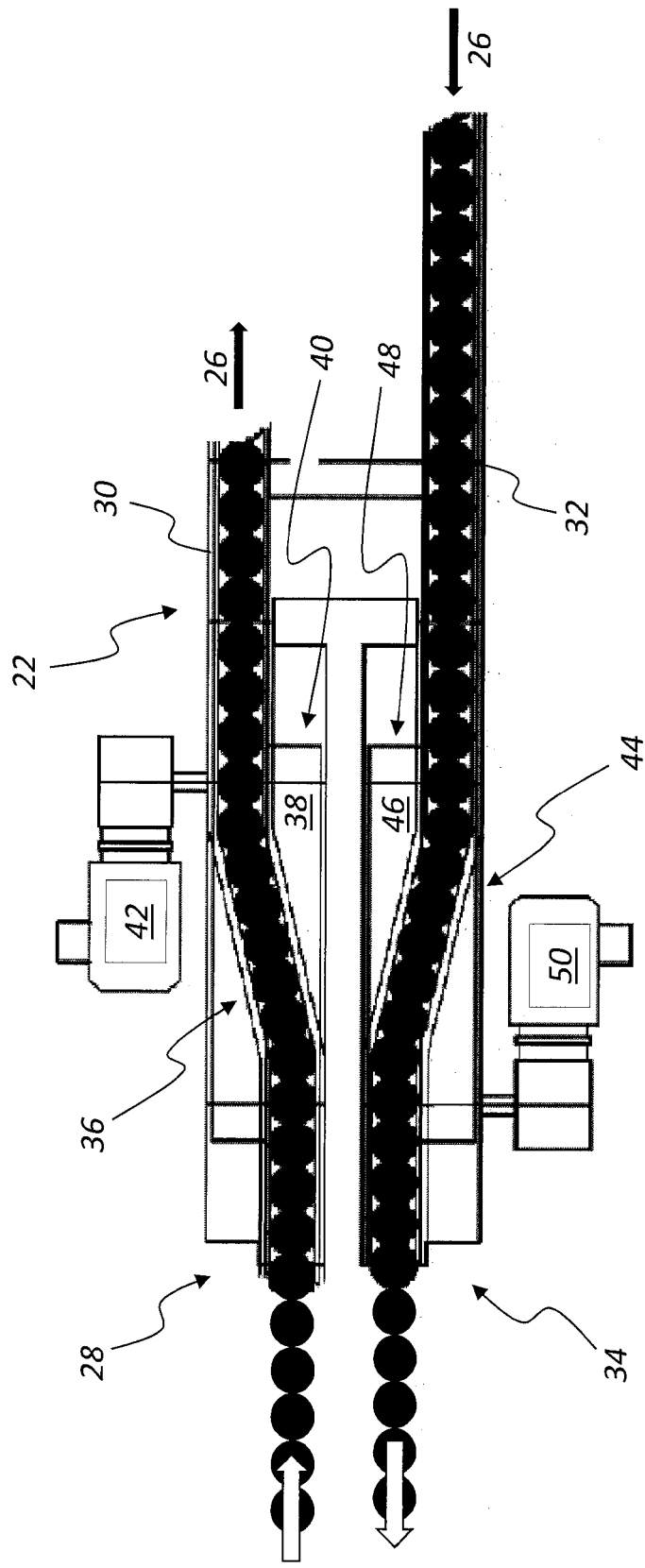

As illustrated by FIG. 1b, a first diagonal diversion 36 is arranged between the receiving point 28 and the first strand 30 of the loading and transport section 22, which diversion 36 serves to transport articles from a supplying horizontal transport section 38—consisting, e.g., of endlessly circulating traction means 40 such as a link belt, etc.—to the first strand 30 of the loading and transport section 22, which moves on the horizontal first level 18 in the storage span 14. The articles 12 run diagonally over a narrow longitudinal gap between the two means of traction 40, which circulate, in sections, parallel and on the same horizontal level and the loading and transport section 22. A first drive motor 42, which drives an index cam on which the traction means 40 runs in a 180° diversion, corresponds to the traction means 40 of the supplying horizontal transport section 38. Additionally, between the second strand 32 of the loading and transport section 22 and the transfer point 34, a second diagonal diversion 44 is arranged, which moves articles 12 from the second strand 32 to a horizontal transport section 46 for removal, which consists, e.g., of another endlessly circulating traction means 48, e.g., a link belt. The articles 12, in turn, run diagonally over a narrow longitudinal gap between the two means of traction 48, which circulate, in sections, parallel and on the same horizontal level and the loading and transport section 22 and traction means 48. The additional traction means 48 of the horizontal transport section 46 for removal may correspond to an additional drive motor, which may, however, be arranged at a different diversion point not shown here.

The second drive motor 50, shown in FIG. 1b, drives a guide pulley, over which the endlessly circulating loading and transport section 22 at the end of the second strand 32 is guided and driven. Typically, the first and second drive motors 42 and 50 provide substantial synchronisation of the circulating traction means 40 and the loading and transport section 22, whilst the additional drive motor, not shown here, of the additional traction means 48 of the horizontal transport section 46 may serve to ensure equal belt speed in this traction means 48.

Optionally, the transfer point 34 may have a connection to other horizontal conveyor devices, not shown here, by which the articles 12 are transported from the storage section 10 to other handling and/or processing stations, or to packaging stations, etc, which are not shown here. As shown in greater detail by reference to FIGS. 2 and 3, arrangements with several storage sections coupled to one another, which may be arranged adjacent and/or parallel to one another are optionally possible, with one transfer point 34 of a first storage section being connected via a short connection section—here with 180° diversion—to a receiving point 28 of a neighbouring storage section.

As can be seen in the lower longitudinal section of FIG. 1a, the empty span 16 circulates on the second level 20, which is below the first level 18 of the storage span 14, whereby the loading and transport sections 22 of the storage span 14 are each diverted in the area of the receiving and transfer points 28 and 34 by first guide pulleys 52, rotatable around horizontal axes, from the first level 18 to the second level 20. Additionally, the endlessly circulating loading and transport sections 22 are connected by a second diverting section 54, which describes a circular arc of approximately 180°, in the area of the empty span 16. The first guide pulley 52, shown in the lower longitudinal section of FIG. 1a, may optionally be coupled with the second drive motor 50, which may drive the endlessly circulating loading and transport sections 22. Both the guide pulleys 52 and the diversion sections 24 and 54 each form diversion angles of approximately 180°, with the diversion sections 24 and 54 each creating a curved course within the horizontal levels 18 and 20, in which the storage span 14 and the empty span 16 each circulate, whilst the guide pulleys 52 create a diversion of the loading and transport sections 22 from the first level 18 to the second level 20, or vice versa.

An important component of the invention is formed by an endless traction means 58 running between the first guide pulleys 52 and the second guide pulleys 56, each of which is diverted by 18°. As shown in FIG. 1a (upper top view), the second guide pulleys 56 correspond to a third drive motor 60, which may drive the endless traction means 58 and position it between two end positions described in greater detail below. An upper span 62 of the endless traction means 58 simultaneously defines the first level 18 on which the storage span 14 is located. Additionally, the first diversion section 24 of the storage span 14 corresponds to the upper span 62 of the adjustable endless traction means 58 running or attached between the first and second guide pulleys 52 and 56, which is arranged in the area of the first level 18. Additionally, a lower span 64 of the endless traction means 58 runs in the area of the second level 20, and is coupled there with the second diversion section 54 of the empty span 16. In other words, the second diversion section 54 of the empty span 16 is fastened to the lower span 64 of the endless traction means 58. As can be seen in the lower longitudinal section in FIG. 1a, thus, the positions of the first diversion section 24 and the second diversion section 54 can be changed in opposite directions by moving the endless traction means 58, which is variably adjustable by means of, and driven by, the drive motor 60, such that a storage volume of the storage span 14 can be varied by changing the position of the first diversion section 24 and changing the position of the second diversion section 54 of the empty span 16. By the coupled movements of the two diversion sections 24 and 54, which carry out respectively opposite movements to the same extent with every change in the position of the endless traction means 58, the capacity of the storage section 10 can be changed in a highly accurately controlled manner. Because not only the first diversion section 24 controls the loading and transport sections 22 of the storage span 14, which move in opposite directions, at a point opposite the receiving and transfer points 28 and 34, but also the second diversion section 54 connects the loading and transport sections 22 of the empty span 16, which move in opposite directions, at a point opposite the receiving and transfer points, the first 24 and second diversion section 54 may, depending on operating conditions, be arranged on top of one another or offset from one another.

Likewise, a different arrangement of the drives (not shown) is possible. Instead of the third drive motor 60, an alternative drive, which pulls the empty span 16 back in the direction of the receiving point 28, may optionally correspond to the guide pulley 52. The traction acting on the two guide pulleys 52 thus results in traction acting on the diversion sections 24 and 54, adjusting a position and thus the storage capacity. The diversion sections in this embodiment are, in themselves, freely movable in both directions.

Both the empty span 16 and the storage span 14 may be formed, in particular, by a common, endlessly circulating conveyor belt, link belt, etc., which allows for transport in vertical or horizontal position of the articles 12, packaged or piece goods and returns empty to the empty span 16, such that the empty span 16 is required only to balance the adjustable-length area of the storage span 14. In order to provide the desired function in the most space-efficient way possible, the first level 18, on which the storage span 14 with its first diversion section 24 is positioned, is arranged above the second level 20, in which the empty span 16 with its section diversion section 54 is positioned.

The endless traction means 58 running between the first and second diverting means 52 and 56 may, in particular, be formed by a flexible conveyor belt, link belt, strap, etc. The inner or bottom sides of the circulating loading and transport sections 22 of the storage span 14 lie on an outer or upper side of the upper span 62 of the endless traction means 58, and slide over them. The inner or bottom sides of the circulating loading and transport sections 22 of the empty span 16 lie on an outer or downward side of the lower span 64 of the endless traction means 58, and also slide over them. The first guide pulleys 52 thus not only divert the endless traction means 58 by 180°, but also divert the loading and transport sections 22 of the storage span 14 and the empty span 16 by 180° in a substantially parallel direction, which are thus diverted by the first guide pulleys 52 by virtue of being placed on the endless traction means 58. The endless traction means 58 thus constitutes not only a component of a precisely controllable, very fast-moving control mechanism for the adjustment of the capacity of the storage section 10, but simultaneously forms part of a support structure for the belt sections of the endlessly circulating loading and transport sections 22, on which the articles 12 are transported in the area of the storage span 14. Optionally, a drive system in the form of the third drive motor 60 to adjust the endless traction means 58 and the diversion sections 24 and 54 coupled with it may correspond to the second guide pulleys.

Figure 2B:
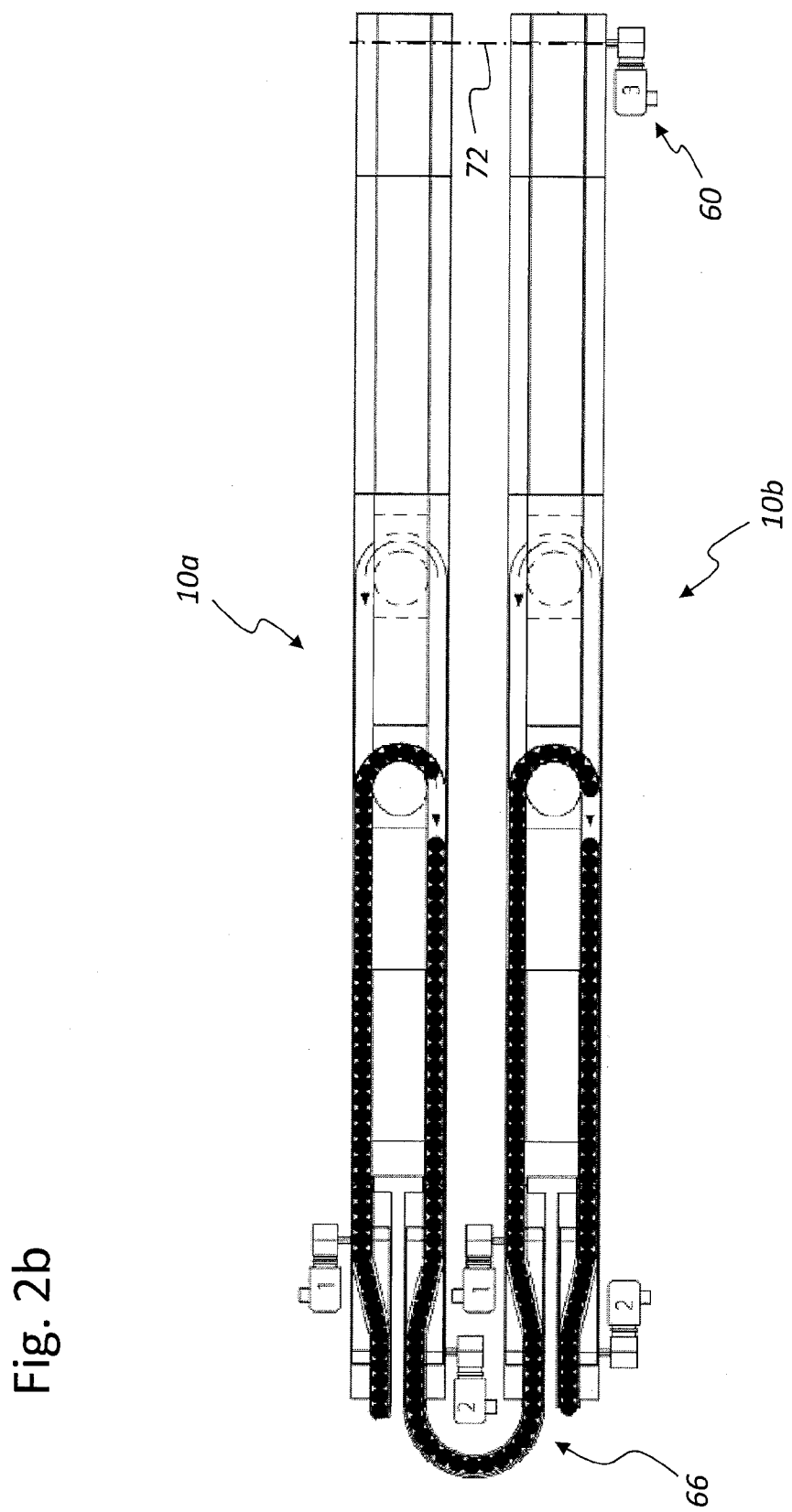
Figure 2C:
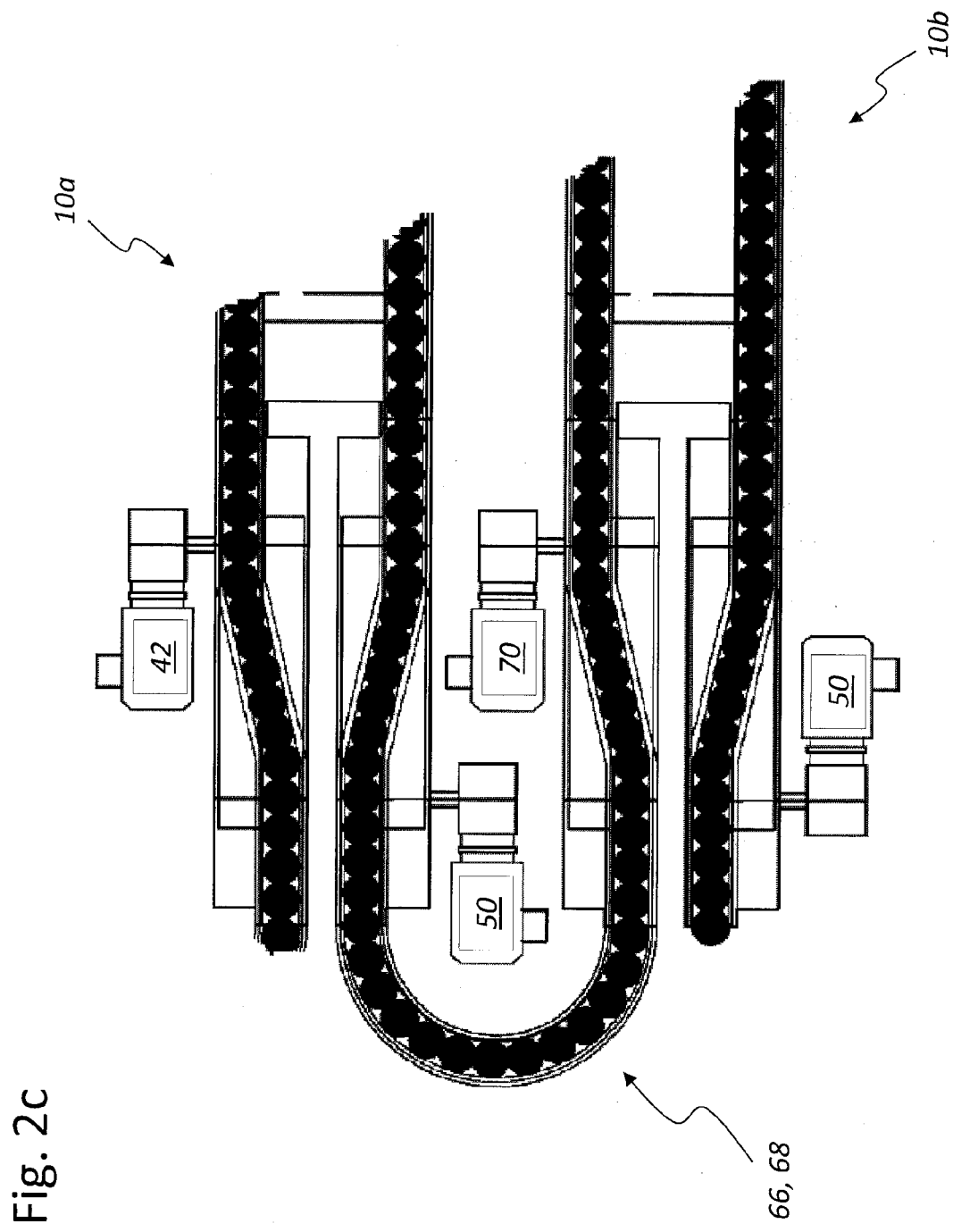

As illustrated by FIGS. 2a, 2b, and 2c, two of the storage sections 10 shown in FIG. 1 may optionally also be coupled with one another, thus doubling the available storage capacity. The two coupled storage sections 10 are preferably placed adjacent and parallel to one another, whereby a transfer point 34 of a first storage section 10a is connected with a receiving point 28 of the adjacent second storage section 10b via a short connection section 66 having a 180° diversion. As shown in the detail view of FIG. 2c, the connection section 66 may consist of a traction means 58, which is driven, e.g., by a fourth drive motor 70. Preferably, this connection section corresponds to a conventional curved conveyor, allowing for an absolutely modular structure. Optionally, the transfer point 34 of the second storage section 10b may have a connection to other horizontal conveyor devices, not shown here, by which the articles 12 are transported from the storage section 10b to other handling and/or processing stations, or to packaging stations, etc, which are not shown here.

As can be seen in FIG. 2a, the second guide pulleys 56 of the two endless traction means 58 of the first and second storage sections 10a and 10b each correspond to separate third drive motors 60, such that individual, deviating adjustments of the two endless traction means 58, and thus deviating changes in capacity of the two storage sections 10a and 10b are possible. Optionally, the two second guide pulleys 56 of the two endless traction means 58 of the first and second storage sections 10a and 10b may correspond to a single third drive motor 60, which may adjust both endless traction means 58 simultaneously via a shaft connection 72, such that, in this way, only joint, synchronised adjustments of the two traction means 58, and thus equal changes in capacity of the two storage sections 10a and 10b, are possible.

As illustrated by FIG. 3, three (or more) of the storage sections 10 shown in FIG. 1 may optionally also be coupled with one another, thus trebling (or multiplying) the available storage capacity. The three coupled storage sections 10a, 10b, and 10c are each placed adjacent and parallel to one another, whereby a transfer point 34 of a first storage section 10a is connected with a receiving point 28 of the adjacent second storage section 10b via a short connection section 66 having a 180° diversion, whilst a transfer point 34 of the second storage section 10b is connected with the receiving point 28 of the adjacent third storage section 10c via another short connection section 66, which also has a 180° diversion. As shown in the detail view of FIG. 2c, the connection sections 66 may each consist of a traction means 68, which are each driven, e.g., by fourth drive motors 70. Optionally, the transfer point 34 of the third storage section 10c may have a connection to other horizontal conveyor devices, not shown here, by which the articles 12 are transported from the storage section 10c to other handling and/or processing stations, or to packaging stations, etc, which are not shown here.

As can be seen in FIG. 3, the second guide pulleys 56 of the endless traction means 58 of the first, second, and third storage sections 10a, 10b, and 10c each correspond to separate third drive motors 60, such that individual, deviating adjustments of the two endless traction means 58, and thus deviating changes in capacity of the storage sections 10a, 10b, and 10c are possible. Optionally, the second guide pulleys 56 of the three endless traction means 58 of the first, second, and third storage sections 10a, 10b, and 10c may correspond to a single third drive motor 60, which may adjust the endless traction means 58 simultaneously via a shaft connection 72, such that, in this way, only joint, synchronised adjustments of the three endless traction means 58, and thus equal changes in capacity of the three storage sections 10a, 10b, and 10c, are possible. However, this alternative variant is not shown here.

The invention was described by reference to a preferred embodiment. However, persons skilled in the art will be aware that variations and modifications of the invention can be made without leaving the scope of the claims below.

REFERENCE NUMERALS

10 Storage section
10a First storage section
10b Second storage section
10c Third storage section
12 Articles
14 Storage span
16 Empty span
18 First level, upper level
20 Second level, lower level
22 and/or transport sections
24 First diversion section
26 Direction of transport
28 Receiving point
30 First strand
32 Second strand
34 Transfer point
36 First diagonal diversion
38 Supplying horizontal transport section
40 Traction means
42 First drive motor
44 Second diagonal diversion
46 Removing horizontal transport section
48 Additional traction means
50 Second drive motor
52 First guide pulleys
54 Second diversion section
56 second guide pulleys
58 Endless traction means
60 Third drive motor
62 Upper span
64 Lower span
66 Connection section
68 Traction means
70 Fourth drive motor
72 Shaft connection

The invention claimed is:

1. Storage section (10, 10a, 10b, 10c) for intermediate storage of articles (12), packaged or piece goods for a conveyor device for the continuous or intermittent transport of articles (12), packaged or piece goods, which storage section (10, 10a, 10b, 10c) has at least one storage span (14) on a first level (18) and at least one empty span (16) connected with it on a second level (20);

wherein the storage span (14) has at least two flexible loading and transport sections (22) for the intermediate storage of articles (12), packaged or piece goods that run parallel to one another in opposite directions on the first level (18), which loading and transport sections (22) are connected by a first diversion section (24) describing a circular arc of approximately 180°;

wherein the loading and transport sections (22) of the storage span (14), which move in opposite directions, are located between locally defined receiving and transfer points (28, 34) for the articles (12), packaged or piece goods being transported from or to additional horizontal transport sections of the conveyor device, wherein the first diversion section (24) connects the loading and transport sections (22) that move in opposite directions at a point opposite the receiving and transfer points (28, 34);

wherein the at least one empty span (16) circulates in the second level (20), beneath the first level (18) of the storage span (14), wherein the loading and transport sections (22) of the storage span (14) each being diverted in the area of the receiving and transfer points (28, 34) by first diverting means from the first level (18) to the second level (20), and wherein the endlessly circulating loading and transport sections (22) being connected in the area of the empty span (16) by a second diversion section (54) that describes a circular arc of approximately 180°;

wherein the second diversion section (54) connects the loading and transport sections (22) of the empty span (16) that move in opposite directions at a point opposite the receiving and transfer points (28, 34);

wherein the first diversion section (24) of the storage span (14) corresponds to, and is coupled directly with, an upper span (62) of an endless traction means (58) adjustable between at least two second diversion means (52, 56) running in the area of the first level (18), the lower span (64) of which runs in the area of the second level (20) and is coupled directly to the second diversion section (54) of the empty span (16);

wherein the position of the first diversion section (24) and the second diversion section (54) can be adjusted in opposite directions by means of movements of the driven endless traction means (58);

such that a storage volume of the storage span (14) can be variably adjusted by position changes of the first diversion section (24) and position changes of the second diversion section (54) of the empty span (16) in the opposite direction;

a horizontal transport section (38) located between the receiving point (28) and the loading and transport section (22), the horizontal transport section (38) including an endlessly circulating traction means (40); and a first diagonal diversion (36) linking the receiving point (28) and a first strand (30) of the loading and transport section (22), the first diagonal diversion (36) configured to guide articles (12) diagonally across the horizontal transport section (38) to the first strand (30) of the loading and transport section (22).

2. Storage section according to claim 1, wherein the empty span (16) and the storage span (14) are formed by a common, endlessly circulating, flexible conveyor belt or link belt.

3. Storage section according to claim 1, wherein the first level (18), in which the storage span (14) with its first diversion section (24) is positioned, is arranged above the second level (20), in which the empty span (16) with its second diversion section (54) is positioned.

4. Storage section according to claim 1, wherein the first and second diversion sections (24, 54) of the storage span (14) or empty span (16) each describe a semicircular arc with a vertical diversion axis.

5. Storage section according to claim 1, wherein the endless traction means (58) running between the two second diverting means (52, 56) is formed by a flexible conveyor belt, link belt, or a strap.

6. Storage section according to claim 5, wherein the second diverting means are each formed by guide pulleys (52, 56) with approximately horizontal rotational axes, and via which the endless traction means (58) is guided and diverted by approximately 180°.

7. Storage section according to claim 1, wherein the inner or bottom sides of the circulating loading and transport sections (22) of the storage span (14) lie on an outer or upper side of the upper span (62) of the endless traction means (58), and slide over them.

8. Storage section according to claim 1, wherein the inner or bottom sides of the circulating loading and transport sections (22) of the empty span (14) lie on an outer or upper side of the lower span (64) of the endless traction means (58), and slide over them.

9. Storage section according to claim 1, wherein at least one of the second diversion means (52, 56) corresponds to a drive system (60) to adjust the endless traction means.

10. Arrangement of two or more storage sections (10, 10a, 10b, 10c) according to claim 1, wherein a transfer point (34) of a first storage section (10a) is coupled with a receiving point (28) of another, adjacent storage section (10b; 10c) via a horizontal transport section formed as an arcuate connection section (66).

11. Arrangement according to claim 10, wherein three or more storage sections (10, 10a, 10b, 10c) are each coupled via horizontal transport sections formed as arcuate connection sections (66).

12. Arrangement according to claim 10, wherein two or more such storage sections (10, 10a, 10b, 10c) each are arranged adjacent to one another on a common horizontal plane with parallel endless traction means (58), each said parallel endless traction means (58) of the two or more storage sections further including a guide pulley (56) via which the endless traction means (58) is guided and diverted by approximately 180°, wherein a shaft connection (72) connects the guide pulleys (56) of the two or more storage sections such that the rotation of the guide pulleys (56) is synchronized, and wherein a single common drive system (60) is coupled to one of the guide pulleys (56) of one of the two or more storage sections.

13. The storage section according to claim 1, further comprising:

a second horizontal transport section (46) located between the loading and transport section (22) and the transfer point (34), the second horizontal transport section (46) including an endlessly circulating traction means (48); and a second diagonal diversion (44) linking a second strand (32) of the loading and transport section (22) and the transfer point (34), the second diagonal diversion (44) configured to guide articles (12) diagonally across the second horizontal transport section (44) from the second strand (32) of the loading and transport section (22) to the transfer point (34).

14. Method for intermediate storage of articles (12), packaged or piece goods transport continuously or intermittently transport by a conveyor device, wherein the articles (12), packaged or piece goods to be stored are transported into a storage section (10, 10a, 10b, 10c) having at least one storage span (14) on a first level (18) and at least one empty span (16) connected with it on a second level (20);

wherein the storage span (14) has at least two flexible loading and transport sections (22) that run parallel to one another in opposite directions on the first level (18) to receive the articles (12), packaged or piece goods for intermediate storage, which loading and transport sections (22) are connected by a first diversion section (24) describing a circular arc of approximately 180°;

wherein the loading and transport sections (22) of the storage span (14), which move in opposite directions, are connected with locally defined receiving and transfer points (28, 34), at which the articles (12), packaged or piece goods are received from or transferred to additional horizontal transport sections of the conveyor device;

wherein the first diversion section (24) connects the loading and transport sections (22) that move in opposite directions at a point opposite the receiving and transfer points (28, 34);

wherein the at least one empty span (16) circulates in the second level (20), beneath the first level (18) of the storage span (14), wherein the loading and transport sections (22) of the storage span (14) each being diverted in the area of the receiving and transfer points (28, 34) by first diverting means from the first level (18) to the second level (20), and wherein the endlessly circulating loading and transport sections (22) being connected in the area of the empty span (16) by a second diversion section (54) that describes a circular arc of approximately 180°;

wherein the second diversion section (54) connects the loading and transport sections (22) of the empty span (16) that move in opposite directions at a point opposite the receiving and transfer points (28, 34);

wherein the first diversion section (24) of the storage span (14) corresponds to, and is coupled directly with, an upper span (62) of an endless traction means (58) adjustable between at least two second diversion means (52, 56) running in the area of the first level (18), the lower span (64) of which runs in the area of the second level (20) and is coupled directly to the second diversion section (54) of the empty span (16);

wherein the position of the first diversion section (24) and the second diversion section (54) are be adjusted in opposite directions by means of movements of the driven endless traction means (58);

such that a storage volume of the storage span (14) is variably adjusted by position changes of the first diversion section (24) and position changes of the second diversion section (54) of the empty span (16) in the opposite direction;

a horizontal transport section (38) located between the receiving point (28) and the loading and transport section (22), the horizontal transport section (38) including an endlessly circulating traction means (40); and a first diagonal diversion (36) linking the receiving point (28) and a first strand (30) of the loading and transport section (22), the first diagonal diversion (36) guiding articles (12) diagonally across the horizontal transport section (38) to the first strand (30) of the loading and transport section (22).

* * * * *